(12) United States Patent
Grant et al.

(10) Patent No.: US 7,723,859 B1
(45) Date of Patent: May 25, 2010

(54) WIND TURBINE WITH DIRECT-CONNECTED VARIABLE SPEED BLOWER

(75) Inventors: James J. Grant, Niskayuna, NY (US); Patrick L. Jansen, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/624,908

(22) Filed: Nov. 24, 2009

(51) Int. Cl.
*F03D 9/00* (2006.01)
*F25B 27/00* (2006.01)

(52) U.S. Cl. .............................. 290/44; 290/55; 62/527
(58) Field of Classification Search .................. 290/43, 290/44, 54, 55; 62/527
See application file for complete search history.

(56) References Cited

U.S. PATENT DOCUMENTS

| | | | |
|---|---|---|---|
| 4,132,912 A | 1/1979 | Wright | |
| 4,348,604 A | 9/1982 | Thode | |
| 4,742,257 A | 5/1988 | Carpenter | |
| 4,908,538 A | 3/1990 | Geberth, Jr. | |
| 5,747,900 A | 5/1998 | Nakamura et al. | |
| 5,925,947 A | 7/1999 | Kajiwara et al. | |
| 6,139,275 A | 10/2000 | Noda et al. | |
| 6,246,134 B1 | 6/2001 | Berrong et al. | |
| 6,606,860 B2 * | 8/2003 | McFarland | 60/648 |
| 6,891,290 B2 | 5/2005 | Nagayama et al. | |
| 7,159,416 B2 * | 1/2007 | Park | 62/527 |
| 7,161,260 B2 * | 1/2007 | Kruger-Gotzmann et al. | 290/55 |
| 7,453,168 B2 * | 11/2008 | Lanie | 290/55 |
| 7,462,964 B2 | 12/2008 | Nagayama et al. | |
| 2004/0150270 A1 | 8/2004 | Nagayama et al. | |
| 2008/0036314 A1 | 2/2008 | Kanei et al. | |
| 2008/0106159 A1 | 5/2008 | Yoshida et al. | |
| 2008/0231126 A1 | 9/2008 | Telore et al. | |

* cited by examiner

*Primary Examiner*—Nicholas Ponomarenko
(74) *Attorney, Agent, or Firm*—James W. Pemrick; Ernest G. Cusick; Frank A. Landgraff (57) ABSTRACT

A wind turbine is provided having at least one generator, and at least one blower motor connected to the generator. The blower motor is configured to rotate the fan for circulating air to the generator. The blower motor is connected to the generator so that a variable power output of the generator results in a variable power output of the blower motor and a variable speed of the fan.

20 Claims, 9 Drawing Sheets

FIG. 10

WIND TURBINE WITH DIRECT-CONNECTED VARIABLE SPEED BLOWER

BACKGROUND OF THE INVENTION

The system described herein relates generally to an improved cooling system. More specifically, the system relates to an improved cooling system for a generator and/or a gearbox in a wind turbine.

Wind is usually considered to be a form of solar energy caused by uneven heating of the atmosphere by the sun, irregularities of the earth's surface, and rotation of the earth. Wind flow patterns are modified by the earth's terrain, bodies of water, and vegetation. The terms wind energy or wind power, describe the process by which the wind is used to rotate a shaft and subsequently generate mechanical power or electricity.

Typically, wind turbines are used to convert the kinetic energy in the wind into mechanical power. This mechanical power may be used for specific tasks (such as grinding grain or pumping water) or a generator may convert this mechanical power (i.e., the rotation of a shaft) into electricity. A wind turbine usually includes an aerodynamic mechanism (e.g., blades) for converting the movement of air into a mechanical motion (e.g., rotation), which is then converted with a generator into electrical power. Power output from the generator is proportional to the cube of the wind speed. As wind speed doubles, the capacity of wind generators increases almost eightfold.

The majority of commercially available wind turbines utilize geared drive trains to connect the turbine blades to the electrical generators. The wind turns the turbine blades, which spin a low speed shaft, which feeds into a gearbox having a higher speed output shaft. This higher speed output shaft connects to a generator which makes electricity. The geared drive aims to increase the velocity of the mechanical motion.

The industry standard drive train for large (e.g., >1 MW) wind turbines consists of discrete gearbox and generator units that are separately mounted to a mainframe (also commonly called a bedframe or bedplate). Power is transferred from the gearbox to the generator via a flexible "high-speed" shaft coupling. This arrangement forces the gearbox and generator to be physically distanced from each other, as well as, requires both the output shaft of the gearbox and the input shaft of the generator to be separately supported by gearbox bearings and generator bearings, respectively.

Heat exchangers are often used to dissipate the heat generated during operation of the generator and/or gearbox. The heat exchanger can include a motor driven fan that forces air over heat exchange elements. Typically, a gearbox heat exchanger (e.g., oil to air) is connected to the gearbox and a generator heat exchanger (e.g., air to air) is mounted to a generator. These heat exchangers with their fan motors consume valuable power.

BRIEF DESCRIPTION OF THE INVENTION

According to one aspect of the present invention, a wind turbine is provided having at least one generator, and at least one blower motor connected to the generator. The blower motor is configured to rotate the fan for circulating air to the generator. The blower motor is connected to the generator so that a variable power output of the generator results in a variable power output of the blower motor and a variable speed of the fan.

According to another aspect of the present invention, a wind turbine is provided having a gearbox and at least one generator. At least one blower motor is connected to the generator, and is configured to rotate the fan for circulating air to at least one of the gearbox and the generator. The blower motor is connected to the generator so that a variable power output of the generator results in a variable power output of the blower motor and a variable speed of the fan.

DETAILED DESCRIPTION OF THE INVENTION

Figure 1:
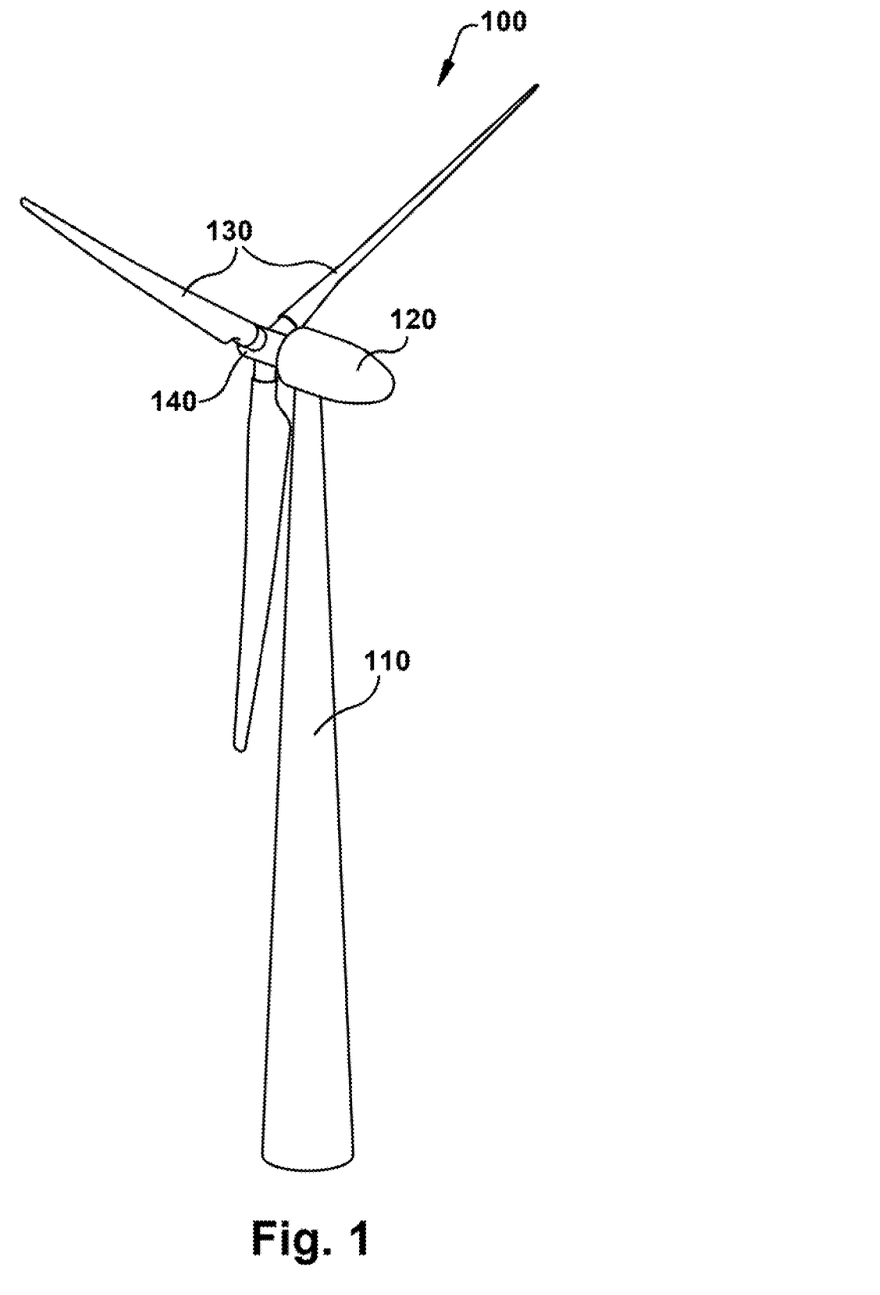
FIG. 1 is a perspective illustration of an exemplary wind turbine.

A typical commercial horizontal axis wind turbine (HAWT) 100 is illustrated in FIG. 1. The wind turbine 100 may include a tubular tower 110, which is often manufactured of steel. The tower 110 may be erected by stacking multiple tower segments on top of each other. The tower 110 supports the weight of the nacelle 120, blades 130 and hub 140. Towers may also be of the lattice (or truss) type, and tubular towers may alternatively be formed of concrete. The nacelle 120 typically houses the drive train (e.g., gearbox, shafts, couplings, generator, etc.), as well as the main frame (also called bedplate) and yaw drives. Other items such as the control electronics may be housed within the nacelle 120 as well. Typically, the nacelle 120 has an outer skin that is comprised of a lightweight material such as fiberglass or a graphite composite. The main function of the nacelle skin is to protect the contents from the elements (e.g., rain, ice, snow, etc.).

The blades 130 are connected to the hub 140, and the hub may contain a pitch control mechanism to control the pitch angle of each blade. Typically, three blades are employed in most commercial wind turbines, however, one, two or four or more blades could be employed as well. The blades convert the kinetic energy of the wind into mechanical energy by rotating a low speed shaft. Blades may be manufactured from fiberglass or graphite composites, fiberglass reinforced plastics or wood/epoxy laminates, or other suitable materials. The low speed shaft is connected to the hub 140 typically via a bolted flange coupling.

Generators are used to convert the rotation of a shaft into electrical energy. A gearbox is typically used to increase the speed of the input shaft to the generator. The gearbox has the low speed shaft as its input, and the output is a higher speed shaft, which can feed directly into the generator. However, some wind turbines use a direct drive configuration, where the gearbox is eliminated. In direct drive turbines, the low speed shaft feeds directly into the generator.

Figure 2:
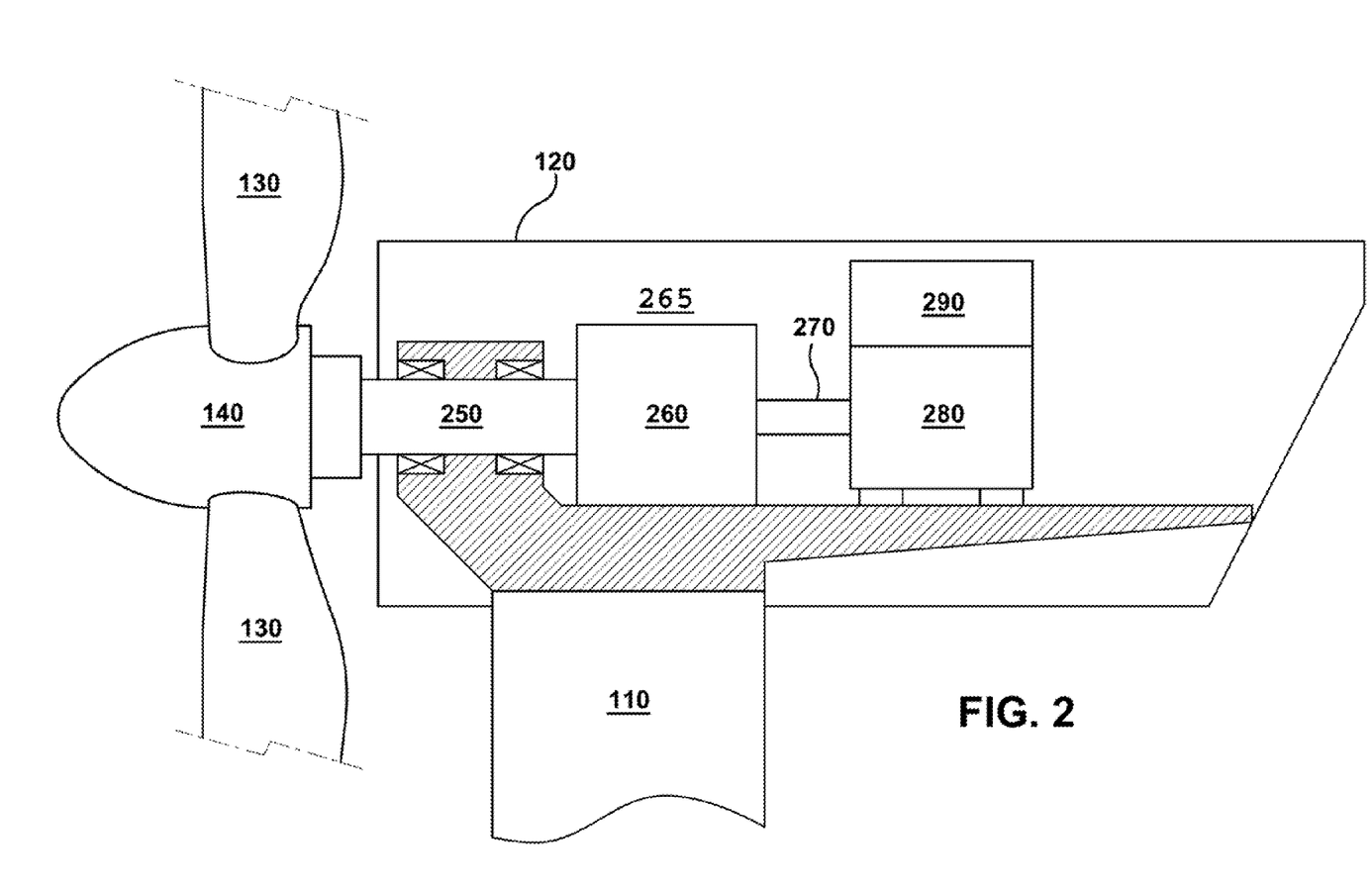
FIG. 2 is a simplified, cross-sectional illustration of a portion of one known wind turbine.

FIG. 2 illustrates a simplified, cross-sectional view of a portion of a wind turbine. The nacelle 120 is mounted on tower 110. Blades 130 connect to hub 140, and drive a low-speed shaft 250 that is connected to gearbox 260. The gearbox drives a high-speed shaft 270, which is connected to generator 280. Typically, an air-to-air heat exchanger 290 is mounted on top of generator 280, and an oil-to-air heat exchanger 265 is mounted on top of gearbox 260 (as illustrated) or often separately located internal or external to the turbine nacelle. The generator 280 is preferably a permanent magnet (PM) type, but can be of any type including those currently used in the wind turbine industry, which include (as non-limiting examples) a permanent magnet (PM) synchronous, a wound-field synchronous, a doubly-fed asynchronous, and a squirrel-cage induction generator.

Generators for wind turbines typically have one or more external blowers and/or fans that are driven by small electric motors (e.g., 3-10 hp induction motors) for thermal ventilation. For reliability and cost reasons, these motors tend to be single-speed motors controlled in a simple on-off manner as function of the wind turbine operating point (i.e., speed and/or power) and/or of the generator temperature (usually as indicated by resistance temperature detectors). Because the blower motors are sized to provide sufficient air flow for generator cooling under the most severe operating conditions (e.g., high-ambient temperature and maximum power load), they are greatly oversized for operation under less severe operating conditions that still require generator airflow for cooling such as during cooler ambient temperatures and/or partial power load. During these operating conditions, the single-speed blowers are operating at full speed even though the full air flow for cooling is not needed, and hence drawing the full allotted auxiliary power for the blower motors. This power is basically going to waste, reducing the overall energy production of the wind turbine from its full entitlement.

Some known attempts to provide a variable-speed blower for generators in wind turbine applications have included the use of variable-speed power-electronic drives (i.e., adjustable speed motor drives/inverters). However, variable-speed drives (VSDs) add significant cost to the ventilation system and introduce a new component with a relatively high failure rate that can shut down an entire wind turbine. Furthermore, VSDs require additional control logic by the turbine level controller, which adds complexity and additional cost. Additional approaches have included the use of multi-speed blower motors or multiple smaller blower motors. Sets of contactors are then used to engage/disengage individual windings of multi-speed motors to set the desired blower motor speed/airflow, or used to stage the engagement/disengagement of individual smaller blower motors to set the desired net blower power and airflow. For cost reasons, multi-speed motor systems are typically only two-speed, and multi-motor systems have only two or three motors. Both systems typically cost significantly more than single-speed, single-motor systems, and compared to VSD systems, provide only discrete steps and hence still waste significant blower power.

Another approach is to provide a mechanical coupling between the generator shaft and the blower impeller or fan shaft, either via direct mounted on a common shaft or via a power train mechanism such as pulleys and belts. This approach, however, severely constrains the integrated generator and ventilation system packaging to a less than optimal configuration, and is generally not attractive in cost or footprint for wind turbine applications.

The present invention provides a low-cost, highly reliable variable-speed blower motor and fan system that matches the thermal ventilation requirements of a wind turbine generator or gearbox at various operating load/speed points, thereby reducing auxiliary power consumption within the wind turbine (compared to prior known solutions) and producing more energy production. Compared to single-speed blower systems currently in use, Annual Energy Production (AEP) increases on the order of about 0.2-0.3% or more can be readily achieved. Additionally, the invention potentially eliminates the need for contactors to control the blower motor, since it can be directly connected to the generator terminals (or tapped winding terminals) and directly controlled by the generator frequency, thereby providing direct material cost savings as well as reliability improvements via the elimination of one possible source of failure (i.e., the contactors).

The present invention provides a direct electrical coupling means between generators and generator thermal ventilation blowers in wind turbines. The electrical output of the generator (or a tapped winding auxiliary output) is used to directly supply the electric motors used to drive blowers. The approach is inherently more efficient, lower-cost, more reliable, and provides significant efficiency improvements compared to currently known systems used in wind turbine generators.

The power flow from wind turbines is highly variable, and correspondingly, the thermal ventilation needs are as well. By direct electrical coupling to the generator, the blowers will track the speed of the generator without need of external controls. Due to the cubic nature of wind power versus speed, this arrangement may provide nearly optimal ventilation for the generator without significant waste of auxiliary power for blower motors, or the cost and reliability disadvantages associated with other means of achieving variable-speed or variable-flow blower controls. The system is also applicable to the gearbox radiator fan motor; i.e., the fan motor(s) can be directly connected to the generator electrical output to provide the same or similar benefits attributable to the generator blower system by this invention.

Figure 3:
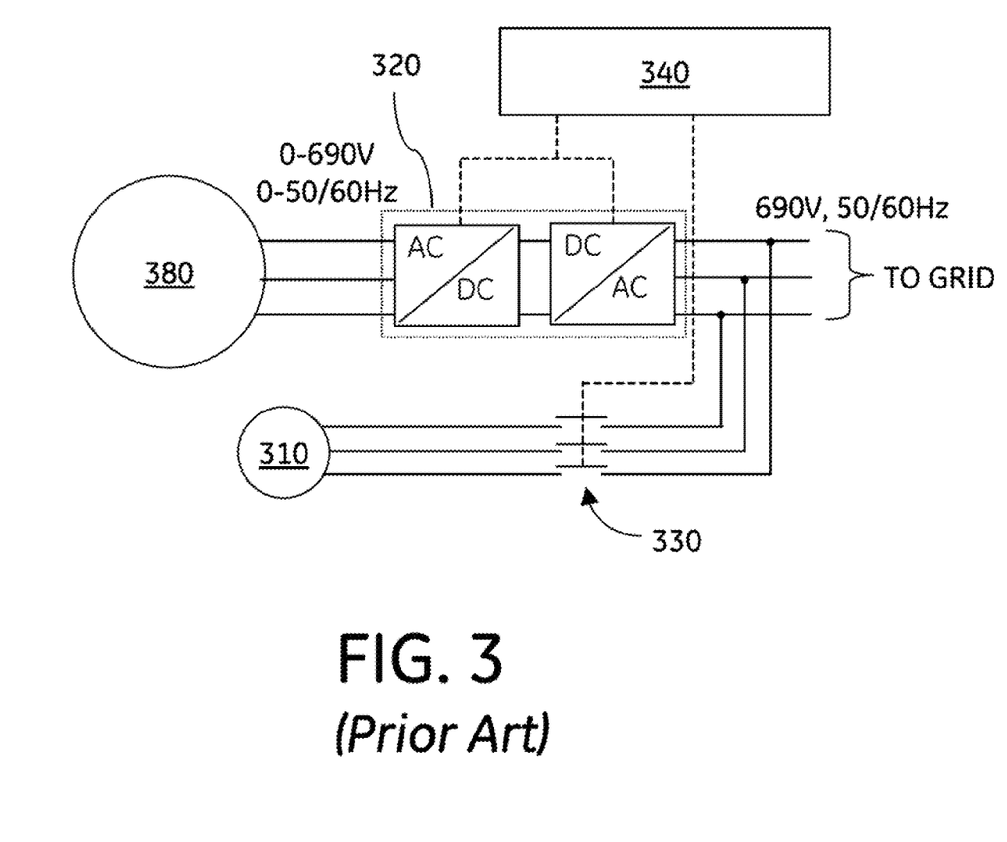
FIG. 3 is an illustration of one known cooling system where power output from the power converter is used to power the blower motor.

FIG. 3 illustrates one known approach for thermal ventilation of generators in wind turbines (e.g., a horizontal axis wind turbine (HAWT) or vertical axis wind turbine (VAWT)). The motor 310 of a blower or fan is supplied by fixed voltage, fixed frequency auxiliary power produced by the wind turbine generator 380. The motor 310 as depicted is a three-phase motor; e.g., a common squirrel-cage induction motor. Typically, in wind turbines with full-power conversion, the power is taken from the output of the power electronic converter 320 prior to being stepped up by a transformer (not shown) to a higher voltage for distribution to the grid beyond the wind turbine. A contactor 330, controlled by a wind turbine controller 340, is used to turn the blower motor 310 on or off based upon either the wind turbine operating point, and/or the generator temperature, usually as sensed from stator resistance temperature detectors (RTDs).

The system as shown is a single-speed blower arrangement without means for varying the ventilation airflow (other than on/off). Alternative arrangements consist of multi-speed blower motors or multiple motorized blowers that are individually controlled in a staged manner via contactors to vary the ventilation airflow in discrete steps as needed. Due to cost and reliability constraints, such systems are typically only two-speed or have two to three blowers, thus the discrete steps are quite large.

Figure 4:
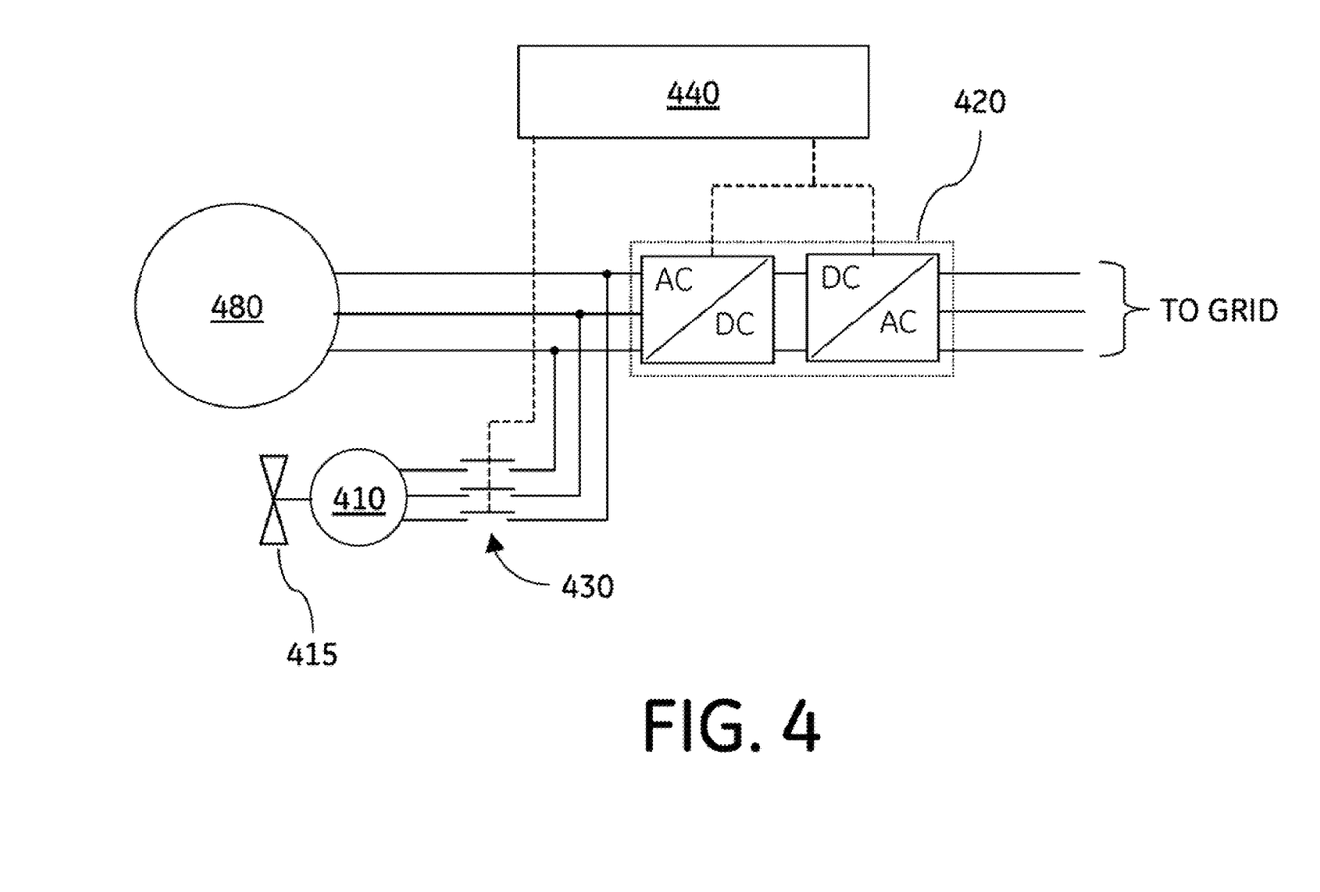
FIG. 4 is an illustration of an improved cooling system where the blower motor is directly connected to the generator output terminals, according to an aspect of the present invention.

FIG. 4 illustrates an improved cooling system, according to one aspect of the present invention, having a blower motor 410 electrically coupled (i.e., supplied) by the variable-speed, variable-frequency output of the wind turbine generator 480. An optional contactor 430 can be used to isolate and/or control by turning on/off the blower motor 410. The blower motor 410 drives a blower or fan 415, which call be used to cool the generator 480 or gearbox 260. The contactor 430 may be used to turn on the blower motor 410 only when the generator is producing power and ventilation is needed, either based on a minimum speed threshold, or a generator, gearbox or ambient air temperature signal.

The motor 410 can be a three-phase motor (e.g., a squirrel-cage induction motor), or any type of blower motor including permanent magnet AC and brushless DC motors. In an embodiment with brushless DC motors, the output of the generator could be first rectified to variable-voltage DC to supply the brushless DC motor; wherein the motor (and blower/fan) speed would be proportional to the rectified DC voltage.

Aspects of the present invention are also applicable to generators with other forms of cooling, including once-through air cooled and liquid cooled. In a once-through air-cooled generator system (i.e., without a heat exchanger), the blower motor 410 supplies and controls the airflow within the generator directly. In a liquid-to-air cooled wind turbine generator system, the blower motor 410 may instead supply and control the airflow through one or more liquid-to-air heat exchangers or radiators. In both, and all similar cases, the system benefits by having the blower motor 410 connected directly to the generator output terminals in a similar manner as with the blower motor supplying airflow through a heat exchanger. In a liquid-to-air cooled system, it may also be advantageous to have the liquid coolant pump also connected to the generator output.

Figure 5:
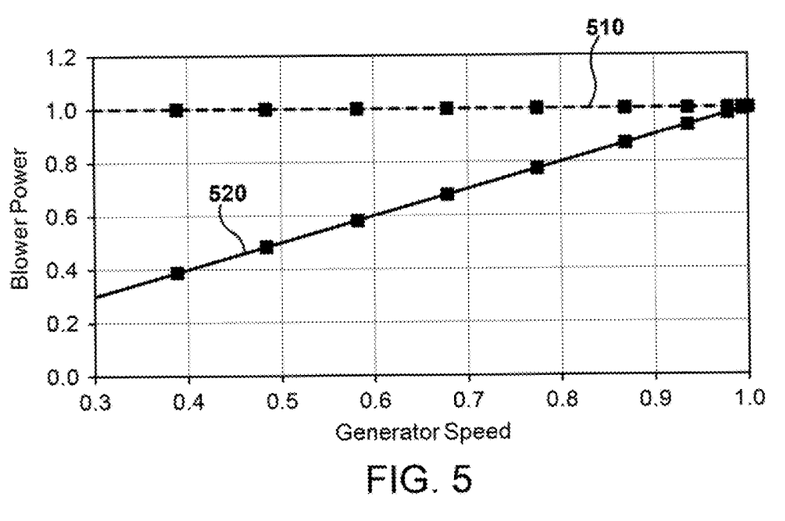
FIG. 5 is an illustration of a chart showing the relationship between blower speed and generator speed for the systems illustrated in FIGS. 3 and 4.

FIG. 5 illustrates a chart showing the blower speed (Y-axis) vs. the generator speed (X-axis) operating characteristics of the direct-connected system of this invention compared against a known single-speed blower system in a wind turbine. The known single-speed blower system 510 has a constant speed vs. generator speed profile. The blower system 520, according to aspects of the present invention, has a speed that increases with increasing generator speed.

Figure 6:
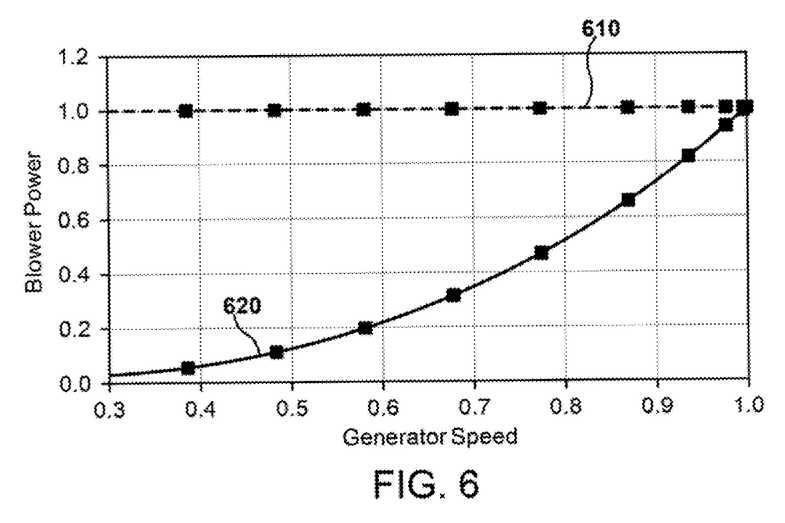
FIG. 6 is an illustration of a chart showing the relationship between blower power and generator speed for the systems illustrated in FIGS. 3 and 4.

FIG. 6 illustrates a chart showing the blower power (Y-axis) vs. the generator speed (X-axis) operating characteristics of the direct-connected system of this invention compared against a known single-speed blower system in a wind turbine. The known single-speed blower system 610 has a constant power vs. generator speed profile. The blower system 620, according to aspects of the present invention, has a power that increases non-linearly with increasing generator speed.

The charts shown in FIGS. 5 and 6 demonstrate that the direct electrical connection of the blower motor 410 to the generator 480 in a wind turbine, results in nearly ideal thermal ventilation airflow over the normal operating range of the generator 480, while simultaneously providing a significant reduction in blower power required, and hence providing a significant increase in annual energy production (as indicated by the region between lines 610 and 620 in FIG. 6) of the wind turbine (e.g., about 0.22% in this example).

Figure 7:
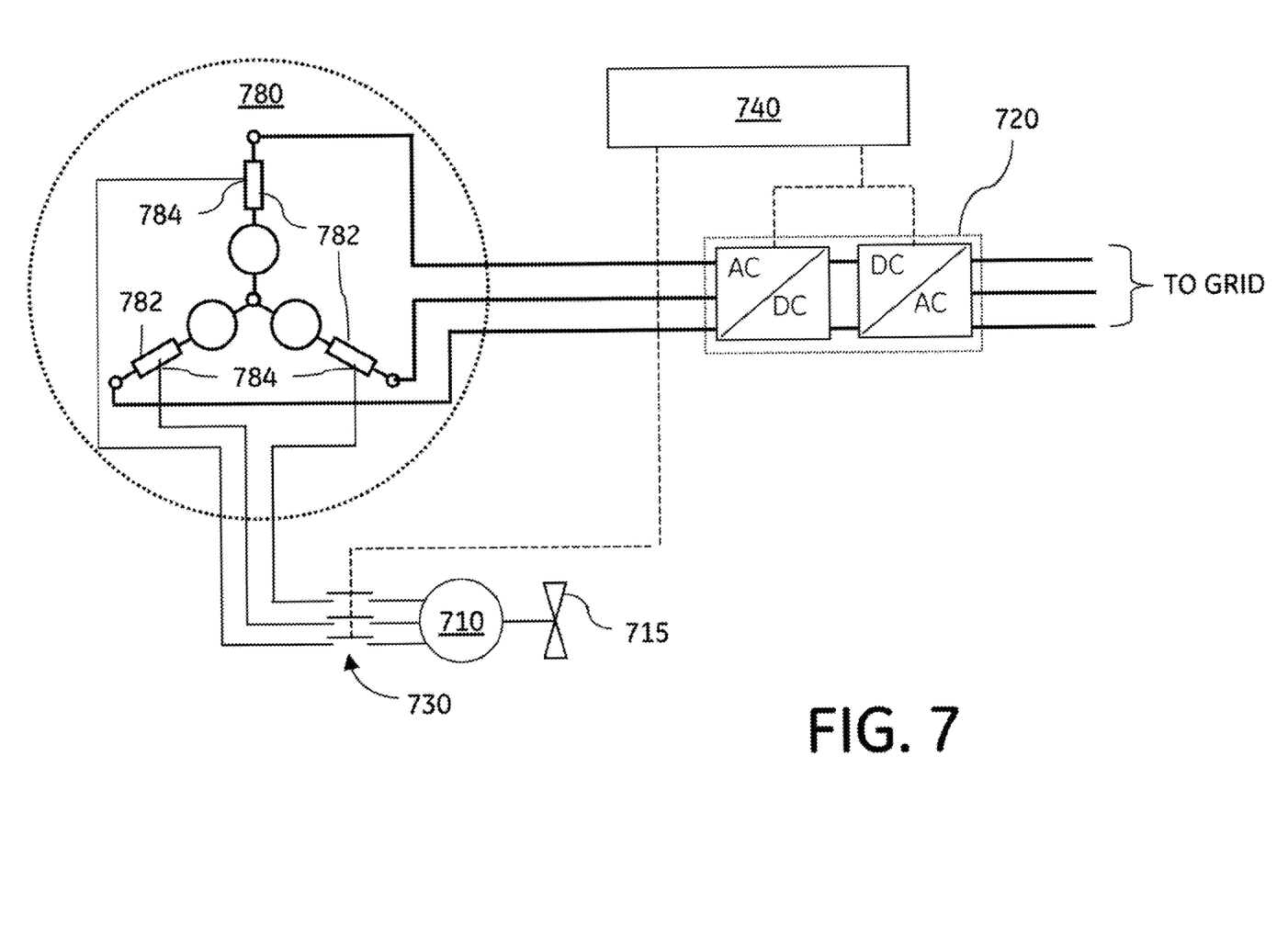
FIG. 7 is an illustration of an improved cooling system where the blower motor is directly connected to the windings of the generator, according to another aspect of the present invention.

FIG. 7 illustrates an improved cooling system, according to another aspect of the present invention, that may be used with medium voltage (MV) generator and converter systems, such as 1380V. Readily available small (~3 hp to ~10 hp) blower motors are low voltage, typically less than 690V. Small blower motors specifically designed for medium voltage generators would need to be custom, form-wound motors and be quite expensive. In this embodiment, the stator windings 782 of the generator 780 are tapped to provide lower voltage auxiliary power terminals to supply a low-voltage blower motor 710. As an example, a 1380V, 6-pole, 3-circuit generator would have two poles per circuit. For this generator 780, taps 784 can be introduced at the mid-point between the windings 782 of the two poles of one circuit, thereby providing 690V (rated) auxiliary power. Power is extracted for the blower motor 710 before the power converter 720. Because the blower motor power required is low, the taps 784 and auxiliary power terminals can be made with relatively small wire size; e.g., about AWG #10, thereby not adding significant cost to the generator 780. Thus for medium voltage generators, this system can provide significant system cost savings, as well as energy production gains. An optional contactor 730 can be controlled by a turbine controller 740 to optionally close when the generator 780 is above a minimum threshold speed and/or above a temperature threshold, and/or to isolate the blower motor 710 and fan 715 if needed.

Figure 8:
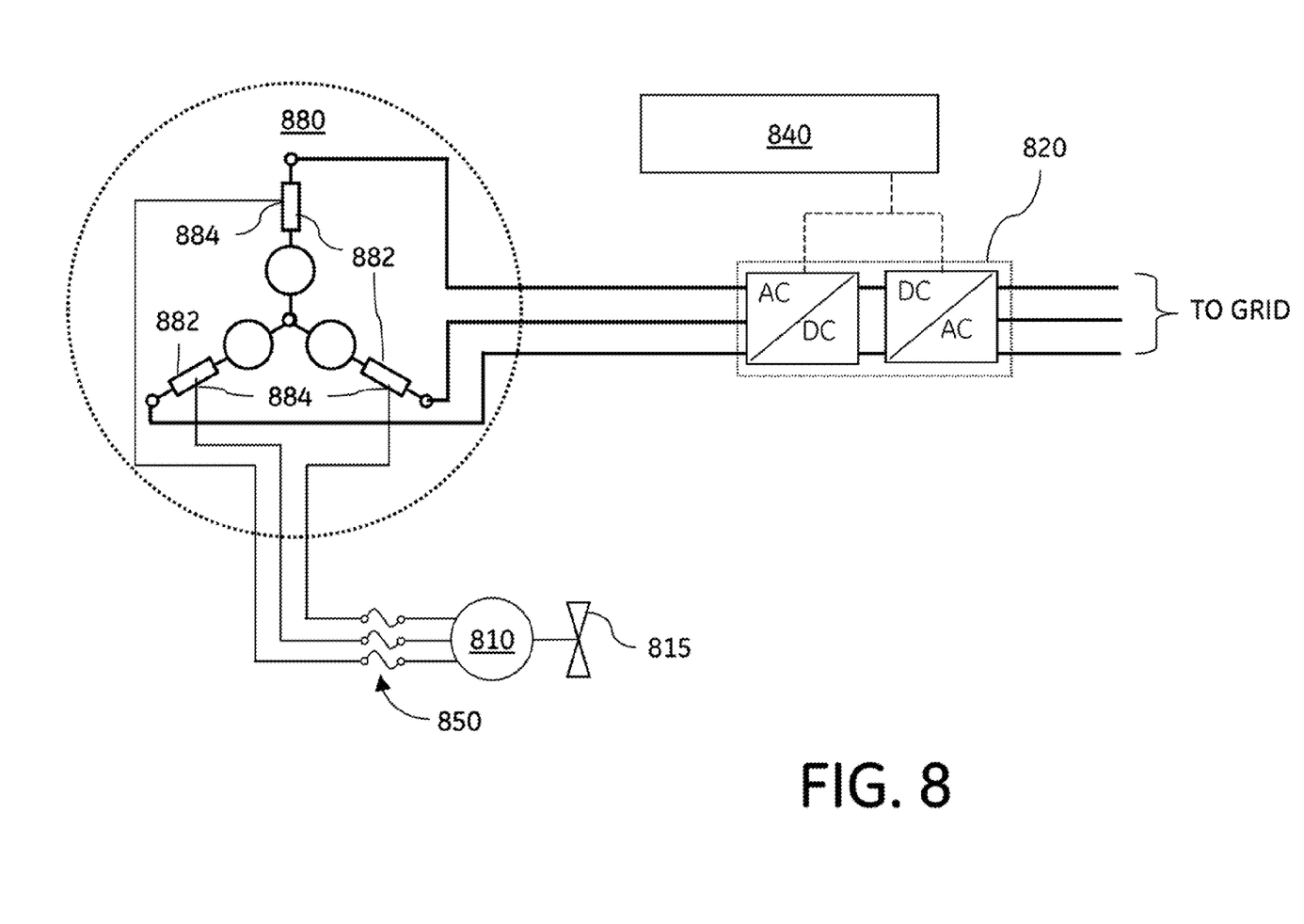
FIG. 8 is an illustration of an improved cooling system where fusible links are connected between the blower motor and the generator, according to a further aspect of the present invention.

FIG. 8 illustrates an improved cooling system, according to another aspect of the present invention, where a set of fuses 850 or fusible links are introduced to protect the generator windings in the event of a failure of the blower motor 810. The blower motor 810 drives a fan 815, which can be used to cool the generator 880 and/or gearbox 260. In this embodiment, the stator windings 882 of the generator 880 are tapped to provide lower voltage auxiliary power terminals to supply a low-voltage blower motor 810. Power is extracted for the blower motor 810 before the power converter 820. A turbine controller 840 may be connected to power converter 820.

Figure 9:
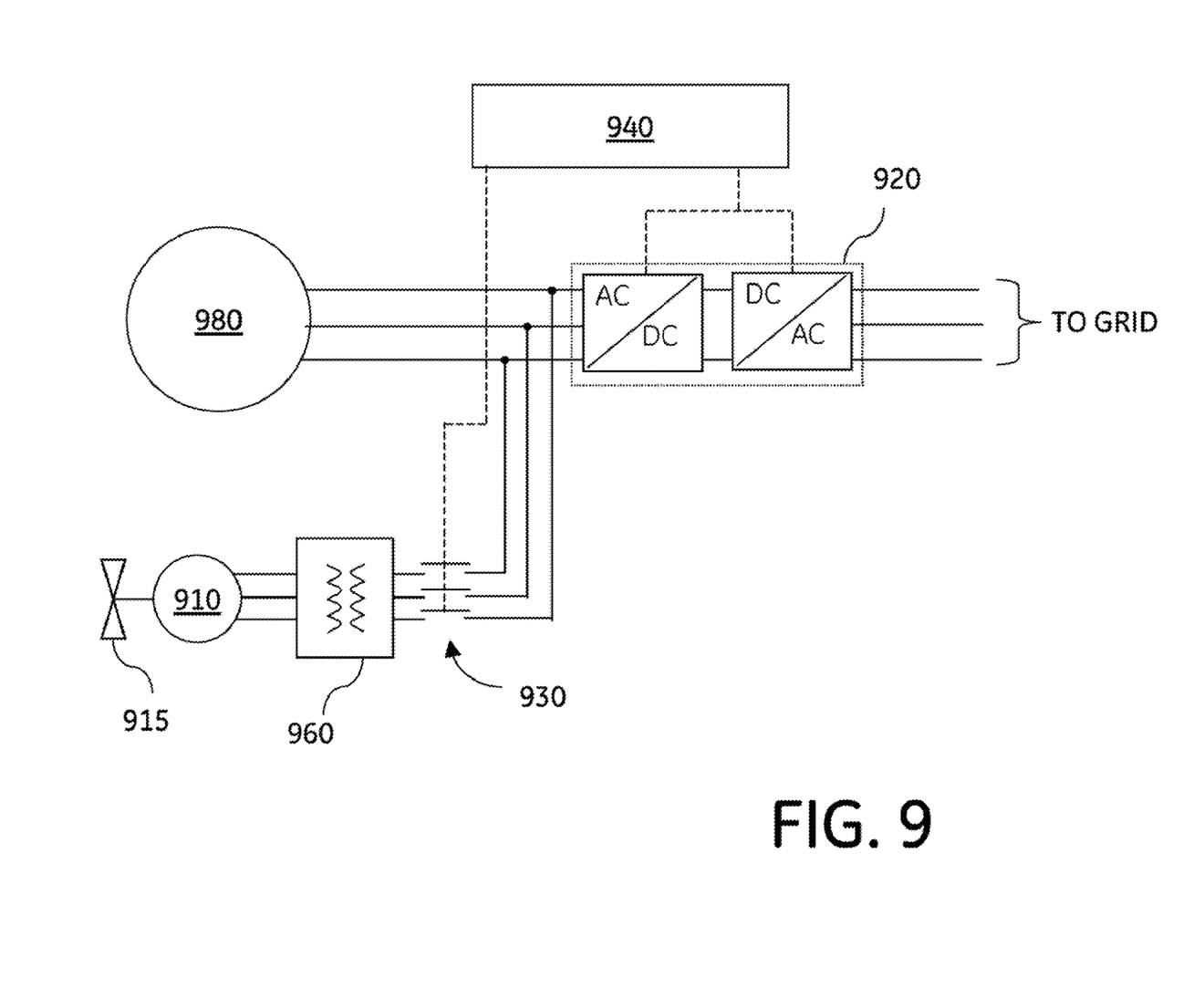
FIG. 9 is an illustration of an improved cooling system where a transformer is connected between the blower motor and the generator, according to an aspect of the present invention.

FIG. 9 illustrates an improved cooling system, according to another aspect of the present invention, that may be used with medium voltage (MV) generator and converter systems, such as 1380V. In this embodiment, a transformer 960 is introduced (instead of tapped windings) to provide a reduced voltage to the blower motor 910 from the generator output terminals. As an example, the transformer 960 can step-down the 1380V from generator 980 to 120V to 480V, or any suitable voltage required by blower motor 910. Power is extracted for the blower motor 910 before the power converter 920. Thus for medium voltage generators, this system can provide significant system cost savings, as well as energy production gains. An optional contactor 930 can be controlled by a turbine controller 940 to optionally close when the generator 980 is above a minimum threshold speed and/or above a temperature threshold, and/or to isolate the blower motor 910 and fan 915 if needed. Fuses (not shown) can alternatively, or additionally, be added before or after contactor 930.

Figure 10:
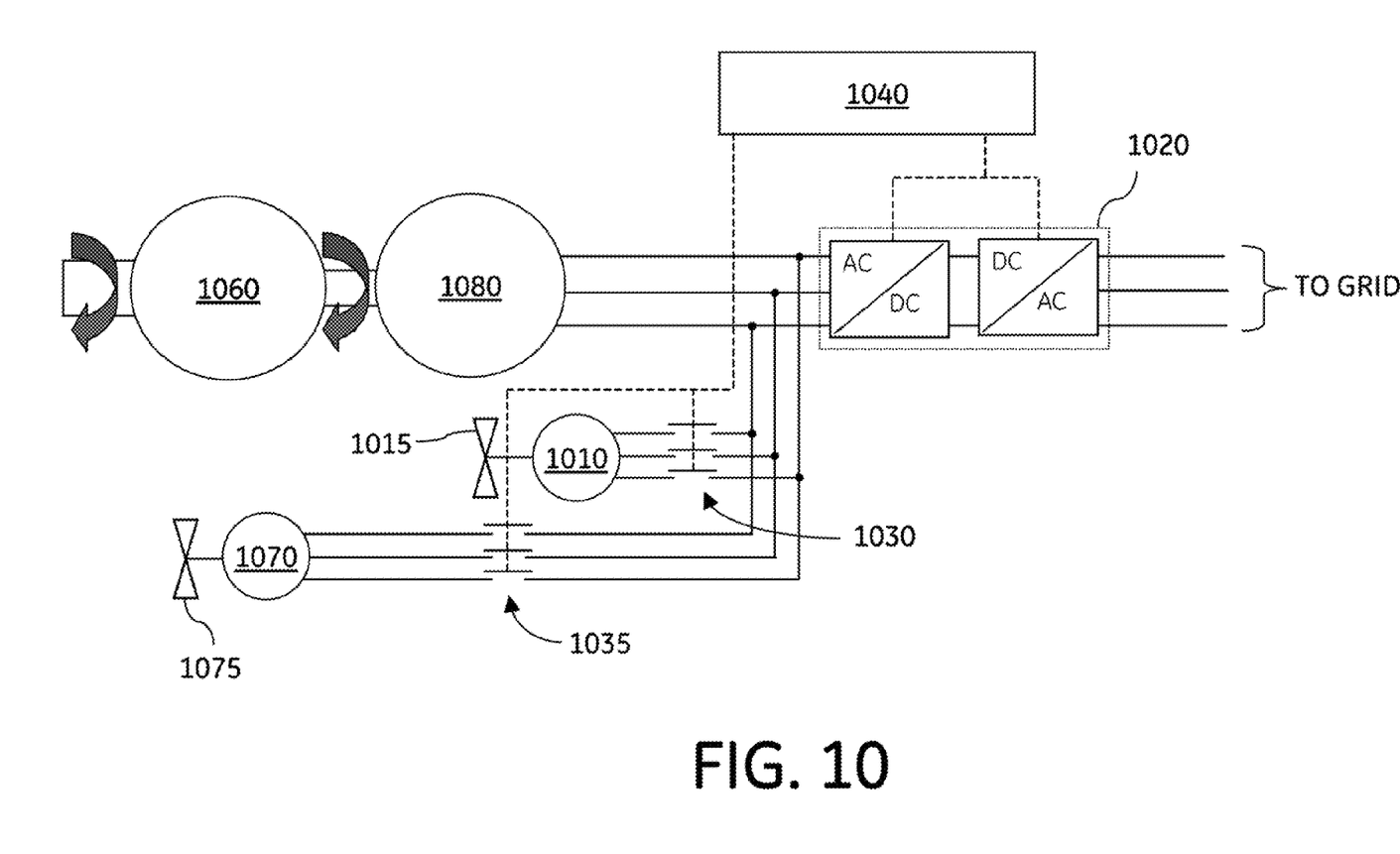
FIG. 10 is an illustration of an improved cooling system where multiple blower motors can be connected to the output of the generator, according to a still further aspect of the present invention.

FIG. 10 illustrates an improved cooling system, according to another aspect of the present invention, having the gearbox cooling fan 1075 and generator cooling fan 1015 connected (via their respective blower motors) to the output of generator 1080 and before the power converter 1020. The blower motor 1010 and blower motor 1070 are electrically coupled in parallel to the variable-speed, variable-frequency output of the generator 1080. Optional contactors 1030 and 1035, controlled by turbine controller 1040, can be used to isolate and/or control by turning on/off the blower motor 1010 and blower motor 1070, respectively. The blower motor 1010 drives a blower or fan 1015, which can be used to cool the generator 480. For example, the fan can force cooling air through the generator heat exchanger (not shown in FIG. 10). Similarly, the blower motor 1070 drives a blower or fan 1075, which can be used to cool the gearbox 1060. For example, the fan 1075 can force cooling air through the gearbox heat exchanger (not shown in FIG. 10). The contactors 1030 and/ or 1035 may be used to turn on the blower motors 1010 and/or 1070 only when the generator 1080 and/or gearbox 1060 are operating and ventilation is needed, either based on a minimum speed threshold, or a generator, gearbox or ambient air temperature signal.

Additionally, the gearbox lube pump motor (not shown) may also potentially be directly connected to the generator output terminals to provide further energy production gains. The tapped winding and transformer embodiments of FIGS. 7-9 are also applicable to the gearbox radiator fan motor(s) and lube pump motor(s), as well as the embodiment shown in FIG. 4. In addition, it is to be understood that the system of the present invention can be used for ventilation, circulation and/ or heating. As one example, airflow may be used for circulation, ventilation or for cooling or heating.

One preferred generator type is a PM synchronous generator, but induction generators, wound-field synchronous generators, or doubly-fed asynchronous generators could be used in all aspects of the present invention as well. A wind turbine employing a single generator has been described, but it is to be understood that multiple generators could also be used with appropriate modifications.

While various embodiments are described herein, it will be appreciated from the specification that various combinations of elements, variations or improvements therein may be made, and are within the scope of the invention.

What is claimed is:

1. A wind turbine, comprising:
   at least one generator;
   at least one blower motor connected to said at least one generator, said at least one blower motor configured to rotate at least one fan for circulating air to said at least one generator;
   wherein said at least one blower motor is connected to said at least one generator so that a variable power output of said at least one generator results in a variable power output of said at least one blower motor and a variable speed of said at least one fan.

2. The wind turbine of claim 1, wherein said at least one blower motor is at least one of:
   a blower motor for a generator heat exchanger and a blower motor for a gearbox heat exchanger.

3. The wind turbine of claim 1, further comprising:
   at least one fusible link connected between said at least one generator and said at least one blower motor;
   wherein said at least one fusible link functions to protect generator windings in the event of a blower motor failure.

4. The wind turbine of claim 1, further comprising:
   at least one transformer connected between said at least one generator and said at least one blower motor;
   wherein said at least one transformer converts a voltage from said at least one generator to a voltage required by said at least one blower motor.

5. The wind turbine of claim 1, further comprising:
   a turbine controller;
   at least one switch connected between said at least one generator and said at least one blower motor, said at least one switch being operative to control power delivery from said at least one generator to said at least one blower motor
   wherein said turbine controller is connected to said at least one switch to control operation of said at least one switch to enable or disable operation of said at least one blower motor.

6. The wind turbine of claim 5, wherein said at least one blower motor is at least one of:
   a blower motor for a generator heat exchanger and a blower motor for a gearbox heat exchanger.

7. The wind turbine of claim 5, further comprising:
   at least one fusible link connected between said at least one generator and said at least one blower motor;
   wherein said at least one fusible link functions to protect generator windings in the event of a blower motor failure.

8. The wind turbine of claim 5, further comprising:
   at least one transformer connected between said at least one generator and said at least one blower motor;
   wherein said at least one transformer converts a voltage from said at least one generator to a voltage required by said at least one blower motor.

9. The wind turbine of claim 1, where the at least one blower motor is connected to said at least one generator at a point between an output of said at least one generator and an input of a power converter.

10. The wind turbine of claim 9, wherein said at least one blower motor is at least one of:
    a blower motor for a generator heat exchanger and a blower motor for a gearbox heat exchanger.

11. The wind turbine of claim 9, further comprising:
    at least one fusible link connected between said at least one generator and said at least one blower motor;
    wherein said at least one fusible link functions to protect generator windings in the event of a blower motor failure.

12. The wind turbine of claim 9, further comprising:
    at least one transformer connected between said at least one generator and said at least one blower motor;
    wherein said at least one transformer converts a voltage from said at least one generator to a voltage required by said at least one blower motor.

13. The wind turbine of claim 1, said at least one generator comprising a plurality of windings and wherein said at least one blower motor is connected by taps to at least a portion of said windings to obtain a reduced voltage level than a maximum voltage level output by said windings.

14. The wind turbine of claim 13, wherein said reduced voltage level is about half of said maximum voltage level.

15. The wind turbine of claim 13, wherein said at least one blower motor is at least one of:
    a blower motor for a generator heat exchanger and a blower motor for a gearbox heat exchanger.

16. The wind turbine of claim 13, further comprising:
    at least one fusible link connected between said at least one generator and said at least one blower motor;
    wherein said at least one fusible link functions to protect generator windings in the event of a blower motor failure.

17. A wind turbine, comprising:
    a gearbox;
    at least one generator;
    at least one blower motor connected to said at least one generator, said at least one blower motor configured to rotate at least one fan for circulating air to at least one of said gearbox and said at least one generator;

wherein said at least one blower motor is connected to said at least one generator so that a variable power output of said at least one generator results in a variable power output of said at least one blower motor and a variable speed of said at least one fan.

18. The wind turbine of claim 17, further comprising:

at least one fusible link connected between said at least one generator and said at least one blower motor;

wherein said at least one fusible link functions to protect generator windings in the event of a blower motor failure.

19. The wind turbine of claim 17, further comprising:

at least one transformer connected between said at least one generator and said at least one blower motor;

wherein said at least one transformer converts a voltage from said at least one generator to a voltage required by said at least one blower motor.

20. The wind turbine of claim 17, said at least one generator comprising a plurality of windings and wherein said at least one blower motor is connected by taps to at least a portion of said windings to obtain a lower voltage level than a maximum voltage level output by said windings.

\* \* \* \* \*